(12) United States Patent
Lohmann (10) Patent No.: US 7,567,272 B2
(45) Date of Patent: Jul. 28, 2009

(54) METHOD AND DEVICE FOR MONITORING AN AREA OF COVERAGE

(75) Inventor: Lutz Lohmann, Olching (DE)

(73) Assignee: Leuze lumiflex GmbH + Co. KG, Fuerstenfeldbruck (DE)

( * ) Notice: Subject to any disclaimer, the term of this patent is extended or adjusted under 35 U.S.C. 154(b) by 945 days.

(21) Appl. No.: 10/702,093

(22) Filed: Nov. 6, 2003

(65) Prior Publication Data

US 2004/0125206 A1 Jul. 1, 2004

(30) Foreign Application Priority Data

Nov. 6, 2002 (DE) ................. 102 51 584

(51) Int. Cl.
*G01T 3/00* (2006.01)
(52) U.S. Cl. .......................... 348/155
(58) Field of Classification Search ............. 348/86, 348/143, 152, 155; 382/291
See application file for complete search history.

(56) References Cited

U.S. PATENT DOCUMENTS

| | | | |
|---|---|---|---|
| 3,010,024 A * | 11/1961 | Barnett et al. ............... | 348/169 |
| 6,678,635 B2 * | 1/2004 | Tovinkere et al. ........... | 702/179 |
| 2001/0041077 A1 * | 11/2001 | Lehner et al. ............... | 396/661 |

FOREIGN PATENT DOCUMENTS

| | | | |
|---|---|---|---|
| DE | 39 39 191 C3 | | 5/1991 |
| DE | 41 13 992 A1 | | 11/1992 |
| DE | 196 03 935 A1 | | 8/1997 |
| DE | 196 19 688 A1 | | 11/1997 |
| DE | 197 49 182 A1 | | 5/1999 |
| DE | 199 38 639 A1 | | 2/2001 |
| DE | 100 00 287 A1 | | 7/2001 |
| DE | 100 02 085 A1 | | 8/2001 |
| DE | 101 20 773 A1 | | 10/2001 |
| EP | 0 179252 A2 | | 9/1985 |
| EP | 0 902 402 A2 | | 3/1999 |
| EP | 1 168 296 A2 | | 1/2002 |
| WO | WO 02/073086 A1 | | 9/2002 |

* cited by examiner

*Primary Examiner*—Nhon T Diep
(74) *Attorney, Agent, or Firm*—Venable LLP; Robert Kinberg; Justine A. Gozzi

(57) ABSTRACT

The invention relates to a method and a device for monitoring an area of coverage around a working tool with the aid of at least one camera. In a first method step, an object-free security zone within the area of coverage is recorded with the camera as reference background. Subsequently, the reference background is checked with respect to its non-homogeneity. In the process, the reference background is rejected as non-valid only if within a predetermined variance distance, the detected non-homogeneity falls below a predetermined level. Otherwise, the reference background is classified as valid. If the reference background is classified as valid, the detection of safety-critical objects entering the security zone is released. The detection occurs through a comparison of the actual images of the security zone recorded with the camera and the valid reference background. A safety-critical object is considered recognized if the respective actual image deviates significantly from the reference background.

24 Claims, 6 Drawing Sheets

METHOD AND DEVICE FOR MONITORING AN AREA OF COVERAGE

CROSS-REFERENCE TO RELATED APPLICATION

Priority is claimed herein with respect to German Application No. 102 51 584.0 filed on Nov. 6, 2002, the subject matter of which is incorporated herein by reference.

BACKGROUND OF THE INVENTION

1. Field of the Invention

The invention relates to a device for monitoring an area of coverage around a working tool.

2. Related Art

The working tool can be an assembly robot, for example, which is used for assembling work pieces. Assembly robots of this type are potentially very dangerous to the operator because the operator normally must insert the work pieces manually into the assembly robot.

Protective devices are generally used to secure such areas of coverage, which devices stop the operation of the working tool in case of an unauthorized operator intervention.

These protective devices in particular can be designed as two-hand controls. Two-hand controls of this type protect the operator's hands because two levers must be activated to trigger and maintain a movement that can be dangerous. As a result, the operator must keep both hands on the levers and is thus protected from injuries during the operation of a working tool. However, the disadvantage of this arrangement is that other individuals in the area of coverage are not protected.

In cases where the working tool is designed as an assembly robot, it is a further disadvantage that the operating cycle of the assembly robot is reduced, thus resulting in an unnecessary restriction of its availability.

Safety light curtains and/or laser scanners are also used as protective devices. A safety light curtain of this type is known, for example, from reference DE 39 39 191 C3. These safety light curtains consist of several pairs of transmitters and receivers that respectively form a light barrier. As a rule, laser scanners serve as protection against stepping behind a light barrier or a light grid.

Safety devices of this type are generally used to monitor a level, two-dimensional area of coverage.

The disadvantage of these types of safety devices is that a plurality of safety devices are required to completely secure the area of coverage around an assembly robot, in particular with respect to access protection and securing of the area. Not only does this represent an undesirably high expenditure, it also requires an involved assembly, wherein the space available for installation of these devices is frequently insufficient.

Reference EP 0 902 402 A2 discloses a method for optically monitoring a three-dimensional space, in particular the door region of an elevator, with the aid of a camera. Alternatively, several cameras can be provided for monitoring respectively different segments of the three-dimensional space. The camera or each camera is designed as a digital camera and is provided with a camera module, an analog/digital converter, an evaluation unit, a micro-processor and an image storage unit. In order to monitor the three-dimensional space, a pixel-type comparison of the grey values of an actual image and the grey values of a reference image takes place in the evaluation unit. In the process, the differences are formed between the grey values of the actual image and the grey values of the reference image. In addition, the micro-processor monitors the camera operation by determining whether a basic brightness for the actual image is not reached and/or is exceeded.

Reference DE 101 20 773 A1 discloses an arrangement comprising a video camera and a device for preventing accidents, wherein the video camera is used to monitor a three-dimensional space. Alternatively, several video cameras can be provided for monitoring respectively different spatial areas. The image-processing system is coupled to or associated with the camera or to each camera. An analog/digital converter, for which the output is coupled to two image-processing channels, is installed downstream of the image-processing system. Both channels are connected to a data comparison unit.

SUMMARY OF THE INVENTION

It is the object of the invention to create a system that ensures a secure monitoring of an area of coverage around a working tool, without resulting in an unnecessary restriction of its availability.

This object is solved with a method for monitoring an area of coverage around a working tool with the aid of at least one camera and including the steps of using the camera to record an object-free security zone within the area of coverage as a reference background; checking the reference background with respect to non-homogeneity, wherein the reference background is rejected as non-valid only if the non-homogeneity detected within a predetermined variance distance falls below a predetermined level and the reference background is otherwise classified as valid; if the reference background is classified as valid, releasing an operation for detecting safety-critical objects entering the security zone by comparing images actually recorded with the camera in the security zone with the valid reference background and wherein a safety-critical object is considered recognized if the respective actual image deviates significantly from the valid reference background.

The device, according to the invention, for monitoring an area of coverage around a working tool includes at least one camera, at least one computer unit that is coupled to the camera and at least one switching output with means integrated into the computer unit for storing and classifying a reference background, wherein the reference background is an image, recorded with the camera, of an object-free security zone within the area of coverage. The device further includes means, integrated into the computer unit, for releasing an object detection in dependence on the classification of the reference background, and means, integrated into the computer unit, for comparing actual images of the security zone, recorded with the camera and a reference background classified as valid, wherein a detection of a safety-critical object within the security zone is ensured if the actual image differs significantly from the reference background and wherein the working tool is activated via the switching output that is triggered by the computer unit, but only if no safety-critical object is located within the security zone.

Advantageous embodiments and useful modifications of the invention are described in the dependent claims.

With the method according to the invention, the area of coverage for a working tool is monitored with the aid of at least one camera. In a first method step, an object-free security zone within the area of coverage is recorded as reference background with the camera. Subsequently, the reference background is checked with respect to non-homogeneity. In the process according to the invention, the reference background is rejected as invalid only if the non-homogeneity that is determined for a predetermined variance distance is lower than previously specified. Otherwise, the reference background is classified as valid. Following this, the operation to detect safety-critical objects that penetrate the security zone is released while the reference background is classified as valid by comparing actual images of the security zone recorded with the camera to the valid reference background. A safety-critical object is considered detected if the respective actual image differs significantly from the reference background.

By referencing the actual image information on the reference background, safety-critical objects can be verified with higher reliability during the detection operation.

It is essential in this case that the reference background is checked with respect to its non-homogeneity and is classified as valid only if this background does not contain homogeneous zones having dimensions larger than the specified variance distance. The variance distance in this case corresponds preferably to half the minimum object size to be detected and thus corresponds to the camera and/or the camera system resolution.

This check of the reference background ensures that the operation to detect safety-critical objects is released only if a continuous non-homogeneous reference background exists. In particular, homogeneous safety-critical objects and especially objects with a uniform color can thus be detected securely against the non-homogeneous reference background because the objects as homogeneous image areas contrast sharply with the non-homogeneous reference background. In the same way, non-homogeneous objects can also be securely detected by comparing the actual images recorded with the camera to the reference background classified as valid since the probability of the non-homogeneous structure of the object being identical to the structure of the reference background is negligibly small.

In order to classify the reference background, a grid of planar zones is defined during the evaluation of the image of the object-free security zone, wherein a predetermined number of receiving elements of the camera are combined in each of the preferably identical zones. A reference image characteristic is derived in each zone for which the dimensions have been adapted to the size of the variance distance. Depending on the design of the camera, the reference image characteristic can be defined as an average value of the grey values or color values of the individual receiving elements of a zone. In that case, the variance distance is preferably defined as the distance between two adjacent zones, wherein a valid reference background exists only if no adjacent zones with identical values for the reference image characteristic are recorded within the zone grid.

The existence of a valid reference background is verified within the framework of a teach-in operation. This teach-in operation ensures that no object is located in the area of coverage, in particular in the security zone. The classification of the reference background is preferably indicated with an indicator output, so that an operator can check whether or not a valid reference background was learned. If no valid reference background exists, the teach-in operation can be repeated. The device for the object detection is released for operation only if a valid reference background was learned.

The most basic design of the device according to the invention is provided with one camera to which a computer unit is coupled. The output signals from the camera are evaluated in the computer unit, wherein a switching output is triggered in dependence thereon, which can then be used to start the working tool operation. In addition, the indicator output can advantageously be triggered with the computer unit. The working tool is activated via the switching output, but only if a valid reference background was learned and the object detection was subsequently released and if no safety-critical object is detected in the security zone during this object detection.

According to one advantageous embodiment, the device according to the invention has a redundant camera system consisting of two cameras and a beam divider which is installed upstream of the cameras. Images of the area of coverage are projected via the beam divider onto both cameras. The device furthermore has two computer units, wherein respectively one computer unit is connected or coupled to one of the cameras for evaluating the image information recorded therein. Both computer units are connected, such that they can monitor each other. The switching output and, if necessary, the indicator output are then activated by both computer units.

The two cameras form a redundant camera system, thus resulting in high detection reliability during the object coverage. The high detection reliability is furthermore ensured by the two-channel computer setup, installed downstream of the cameras.

The image processing according to the invention thus occurs in such a way that respectively the same image of the area of coverage is projected onto the camera by the beam divider. The image information generated by a camera during the teach-in operation for checking the reference background and during the subsequent object coverage is respectively evaluated in the computer unit that follows this camera. In addition, a comparison of the evaluation results from both computer units is made, wherein this comparison occurs preferably on an image characteristic level. In the process, the object detection following the teach-in operation is released only if the reference background in both computer units is classified as valid. During the following object coverage, a comparison is made in both computer units of the actually detected image and the reference background stored in the respective computer unit.

The device according to the invention preferably forms a system with diverse redundancy. The cameras, which are preferably identical or at least operate in the same way, as well as the downstream-connected computer units form a redundant optical and hardware system while the design for the computer unit software is diverse. It means that the computer units use differently configured software structures which can be realized by installing different software modules or running different program sequences on the computer units.

A high reliability for evaluating the image detection is thus achieved with the device according to the invention, so that the device meets the safety-technical requirements for use in the area of individual protection.

Thus, with the device according to the invention and a suitable selection of the area that is covered by the camera system, it is possible to protect the access area as well as the region around a working tool. The working tool is preferably a working robot, in particular an assembly robot. In general, the working tool can be a printing machine, a feeding device, a press, in particular a folding press or the like.

The invention additionally has the advantage that within the area of coverage recorded by the camera system, safety-critical objects such as hands or fingers of a person can be distinguished from non safety-critical objects. This distinction is usefully made with the image characteristic analysis realized in the computer units.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE PREFERRED EMBODIMENTS

Figure 1:
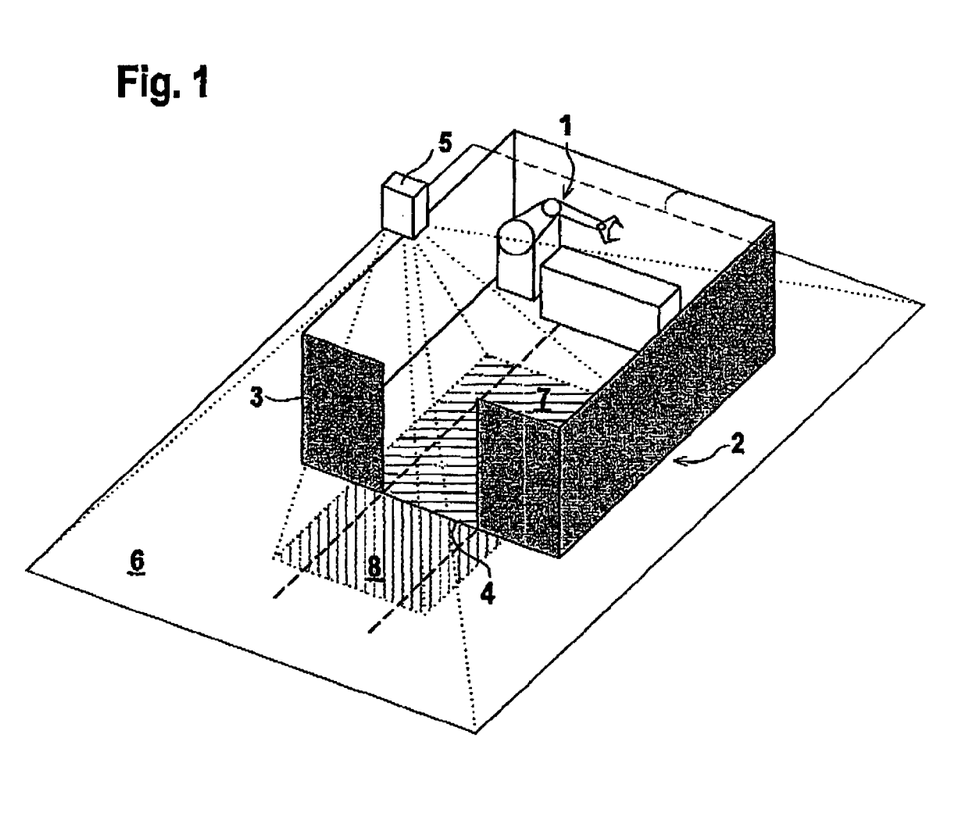
FIG. 1 is a working tool embodied as assembly robot, having a device according to the invention for monitoring an area of coverage in the access area to the assembly robot.

FIG. 1 shows an exemplary embodiment for a protective device used to monitor the surrounding area of a working tool embodied as assembly robot. For the present example, the working robot is an assembly robot 1.

The assembly robot 1 is located within a fenced-in production cell 2 with a fencing 3 which is provided with an access opening 4. Objects are inserted into the production cell 2 via the access opening 4 and are also removed from this cell. In addition, the operating personnel can access the production cell 2 via this access opening 4. The protective device is the device 5 according to the invention, which is used to monitor an area of coverage 6. The area of coverage 6 for the present case extends over the region of the production cell 2 as well as the surrounding area.

The device 5 is integrated into a housing which is fitted form-fittingly onto a mechanical holder, not shown herein, such that it is arranged at an angle above the assembly robot 1. The mechanical holder can be adjusted in all three spatial directions to align the device 5.

Figure 2:
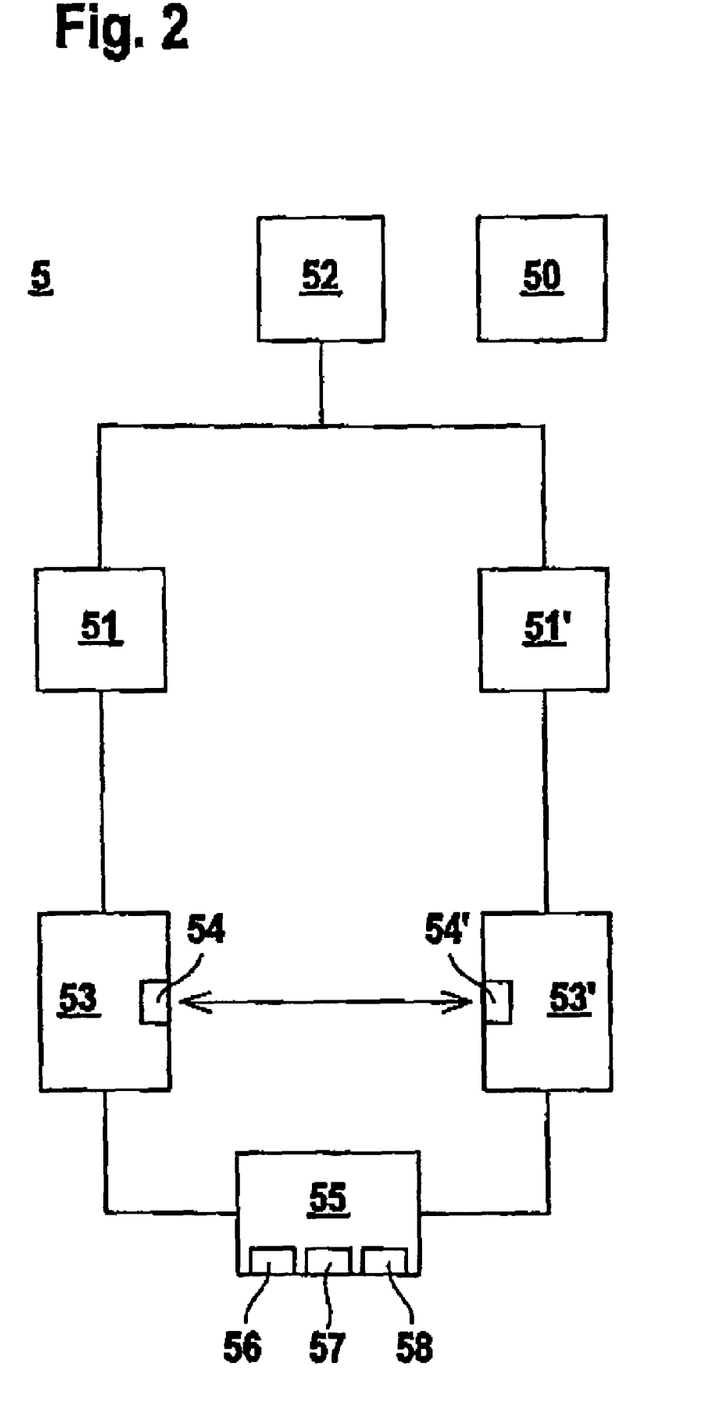
FIG. 2 is a block diagram of the device according to the invention as shown in FIG. 1.

FIG. 2 schematically shows the configuration of the device 5 according to the invention. The device 5 has a lighting system 50 for illuminating the area of coverage 6 to be monitored. The device 5 furthermore has a redundant camera system. The camera system comprises two cameras 51, 51' and a beam divider 52 that is installed upstream of the cameras. In the present case, the cameras 51, 51' have identical designs and are, for example, CMOS or CCD (Charge-Coupled Device) cameras. Each camera 51, 51' has a matrix-type arrangement of receiving elements, wherein different cameras 51, 51' can in principle be used. However, the operation of the cameras must be the same, at least with respect to the optical parameters as well as the resolution and the size of the light-sensitive surface. The beam divider 52 is a beam-divider objective or the like. With the aid of the beam divider 52, the same image of the area of coverage 6 is respectively projected onto the light-sensitive surfaces of the cameras 51, 51'.

Respectively, one computer unit 53 or 53' is connected to each camera 51, 51'. The two computer units 53, 53' form a two-channel evaluation unit for evaluating the image information generated in the cameras 51, 51'. The computer units 53, 53' are furthermore connected to each other, wherein each computer unit 53, 53' is provided with a corresponding interface 54, 54'. A bidirectional data exchange between the computer units 53, 53' takes place via the interfaces 54, 54'.

The outputs of the computer units 53, 53' are conducted to an output circuit 55. For the present case, the output circuit 55 comprises a switching output 56, a warning output 57 and an indicator output 58. The switching output 56 and preferably also the warning output 57 as well as the indicator output 58 are designed as self-testing safety outputs.

The device 5 according to the invention forms a system with diverse redundancy. The cameras 51, 51' as well as the hardware structures of the computer units 53, 53' have a redundant design while the software for the computer units 53, 53' has a diverse design. This is achieved with the aid of different software structures for the computer units 53, 53'. On the one hand, it can be achieved by installing different types of software modules in the computer units 53, 53'. On the other hand, the diverse software structure can also be created by realizing different program sequences in the computer units 53, 53'.

The image information from the cameras 51, 51' is read into the respectively connected computer units 53 or 53' where the analog image information is initially digitized and is then evaluated.

Depending on whether the cameras 51, 51' are grey-value cameras or color cameras, the evaluation occurs in the form of a grey-value analysis or a color characteristic analysis.

The device 5 is used to check whether a safety-critical object is located within a security zone 7 inside the area of coverage 6. If that is the case, the working tool operation is stopped via the device 5 to protect the operator. However, if no safety-critical object is located in the security zone 7, then the operation of the working tool is released via the device 5.

The working tool is activated with the aid of a binary switching signal which is transmitted via the switching output 56 to the working tool. The switching output 56 alternatively can be connected via a safety bus system to the working tool.

For the simplest case, the security zone 7 where safety-critical objects are detected covers the same area as the area of coverage 6 that is monitored by the device 5. The security zone 7 is usefully limited to the regions within the area of coverage 6 where danger to the operating personnel must be feared. For the case shown in FIG. 1, the security zone 7 represents a three-dimensional partial region of the area of coverage 6, which is located within the fenced area 3. The pivoting range for the assembly robot 1, which represents the danger zone, is thus covered along with the security zone 7.

In addition to the security zone 7, a warning zone 8 is shown in the exemplary embodiment according to FIG. 1. The warning zone 8 is located in the area surrounding the security zone 7 and directly adjoins the outside of the fencing 3 in the region of the access opening 4.

In the device 5, the warning output 57 is assigned to the warning zone 8 which controls a warning indicator that is not shown herein. Whether or not a safety-critical object is located in the warning zone 8 is recorded in the device 5. A binary signal is generated in dependence thereon, wherein the respective switching state of the signal is output via the warning output 57. In case a safety-critical object is recorded in the warning zone 8, the warning indicator is activated via the switching state generated as a result and emits an acoustical and/or optical warning signal.

A reference image comparison permits the object detection within the security zone 7 and advantageously also within the warning zone 8.

A teach-in program is realized for this before the start of the operating phase for device 5 in order to learn a reference background. In the process, the object-free security zone 7 and the object-free warning zone 8 are detected with the aid of the camera system for the device 5. The respective image information is stored as reference background. The device 5 of the present case has a two-channel design, so that the reference background is stored in both computer units 53, 53'.

The reference background is then classified as valid or non-valid in each computer unit 53, 53', wherein the reference background is checked with respect to its non-homogeneity. A reference background is classified as valid only if it does not contain homogeneous regions with dimensions larger or equal to a variance distance, wherein the variance distance preferably corresponds to half the minimum object size which can be detected with the device 5.

In order to check the reference background, the matrix-type receiving elements of the assigned camera 51, 51' in each computer unit 53, 53' are divided into planar zones. These zones are preferably identical in size and are adapted to the size of the variance distance.

A reference image characteristic for evaluating the non-homogeneous structure of the reference background is derived in each of the zones from the output signals of the receiving elements for this zone and is used for evaluating the image information for the image of the object-free security zone 7 and the warning zone 8 which forms the reference background.

Depending on the camera 51, 51' design, the average of the grey values or color values that form the output signals of the receiving elements of a zone is formed in the case at hand as reference image characteristic. Subsequently, the average values of adjacent zones, obtained in this way, are compared. A non-valid reference background exists if within the complete reference background the same average value is obtained for at least two adjacent zones within predetermined tolerance limits in at least one computer unit 53, 53'. In contrast, a valid reference background exists only if a check of the reference background in both computer units 53, 53' shows that no adjacent zones with the same reference image characteristic exist within the reference background. The variance distance is thus defined during this check by the distance between two neighboring zones.

The two switching states of the binary control signal that is generated in both computer units 53, 53' indicate whether a valid or a non-valid reference background exists. In the process, the control signal is transmitted to the indicator output 58, by means of which the switching states of the control signal are visualized.

The detection of objects in the security zone 7 and the warning zone 8 is released or blocked in dependence on the switching states of the control signal.

The object detection is not released if a non-valid reference background exists, meaning the device 5 cannot monitor the security zone 7. Accordingly, the working tool operation is also blocked via the switching output 56.

An operator can recognize from the signal emitted at the indicator output 58 that a non-valid reference background was learned and the device 5 is therefore blocked. The operator can then repeat the teach-in operation until a valid reference background is learned.

As soon as a valid reference background is learned, the control signal will release the object detection operation in the device 5.

Objects are detected within the protection zone 7 and the warning zone 8 by comparing the images actually recorded with the camera system to the valid reference background stored in the computer units 53, 53'.

In the process, image characteristics are obtained from the actual image information, which are then used to detect and classify an object.

In the process, the receiving elements of the respective camera 51, 51' are preferably divided into the same zones, which were also used for classifying the reference background. An image characteristic is detected within each zone. For the simplest case, the averages are again formed of the output signals for the receiving elements of a zone which are embodied as grey values or color values.

For the object detection, the image characteristics of the actual images recorded with the camera 51, 51' are compared to the reference image characteristic for the stored reference background. An object is viewed as recognized in a computer unit 53, 53' if at least one image characteristic does not coincide with the associated reference image characteristic.

As a result of the evaluation of the image characteristics, a distinction is made in particular between safety-critical and non safety-critical objects. The safety-critical objects include operating personnel, in particular the arms of an operator. Non safety-critical objects, for example, are static objects in the area surrounding the assembly robot 1 and especially the parts to be worked on by the robot.

The results of the image evaluation which are obtained with the individual computer units 53, 53' are then compared, wherein the comparison preferably occurs on the level of the individual image characteristics.

A safety-critical object is considered recognized if the image characteristics corresponding to a safety-critical object are detected in the same way in both computer units 53, 53'. If a safety-critical object is detected within the security zone 7, this results in a shutdown of the working tool.

The working tool is furthermore shut down for safety reasons if the comparison of the image characteristics, obtained with the computer units 53, 53', does not lead to a corresponding result since it cannot be ruled out in that case that a safety-critical object is located in the security zone 7.

A warning indicator is used to signal if a safety-critical object is recorded in the warning zone 8. An operator is thus made aware of the fact that a safety-critical object is located in the immediate area of the security zone 7. In particular, it is signaled to the operator that his/her arms are near the security zone 7, so that the operator can avoid the danger of injury by removing his/her hands from the warning zone 8. This does not require an intervention into the security zone 7, which would result in an undesirable shutdown of the assembly robot 1.

According to one advantageous modification of the invention, the movement direction of a safety-critical object is detected within the warning zone 8.

Activating the warning indicator 60 in this case makes sense only if a safety-critical object within the warning zone 8 moves toward the security zone 7.

In principle, an area of coverage 6 that is covered by a device 5 can respectively be subdivided into several security zones 7 and warning zones 8. The reference background in this case advantageously comprises all security zones 7 and warning zones 8, so that objects can again be detected in this background through a reference image comparison. A separate switching output 56 is respectively assigned to each security zone 7 and a separate warning output 57 to each warning zone 8.

The working tool is shut down via the device 5 if at least one safety-critical object is recorded in at least one security zone 7.

Depending on the use, a separate warning indicator can be provided for each warning zone 8. Alternatively, a warning indicator can also be assigned to several warning outputs.

In the process, the switching states of the switching outputs 56 and the warning outputs 57 can be visualized by using suitable display means provided for this.

The exemplary embodiment according to FIG. 1, for example, can be visualized in the form of a traffic light. If such a traffic light is red, then a safety-critical object is located in the security zone 7. A yellow light means a safety-critical object is located in the warning zone 8 while the security zone 7 is clear. A green light indicates that no safety-critical object is located in the security zone 7 or in the warning zone 8.

The dimensions for the security zone 7 and/or the warning zone 8 can be input, for example, by entering parameters into the device 5.

For example, the device 5 can be connected to a computer, e.g. a personal computer, for the start-up and configuration of the protective device 5. The parameters for the security zones 7 and/or the warning zones 8 can then be plotted graphically with the PC mouse on the respective recorded image.

Alternatively, the security zones 7 and/or the warning zones 8 can be dimensioned by using a teach-in operation prior to starting up the device 5.

Furthermore, the aforementioned configuration options can also be used to define regions within the area of coverage 6, which are exempted from the monitoring through blanking them out. These regions can also overlap in particular with the security zones 7. During the subsequent operating phase of the device 5, these regions are preferably activated at predetermined intervals. During these intervals, the working tool is not shut down and a warning signal is not issued if a safety-critical object penetrates such a region.

The definition of such regions in particular makes sense if the operation of dangerous working tool components is stopped at predetermined intervals, for example, so that the operating personnel in the surrounding area is not in danger during these intervals. It makes sense if the security zones 7 and the warning zones 8 are defined application specific during the configuration.

Figure 3:
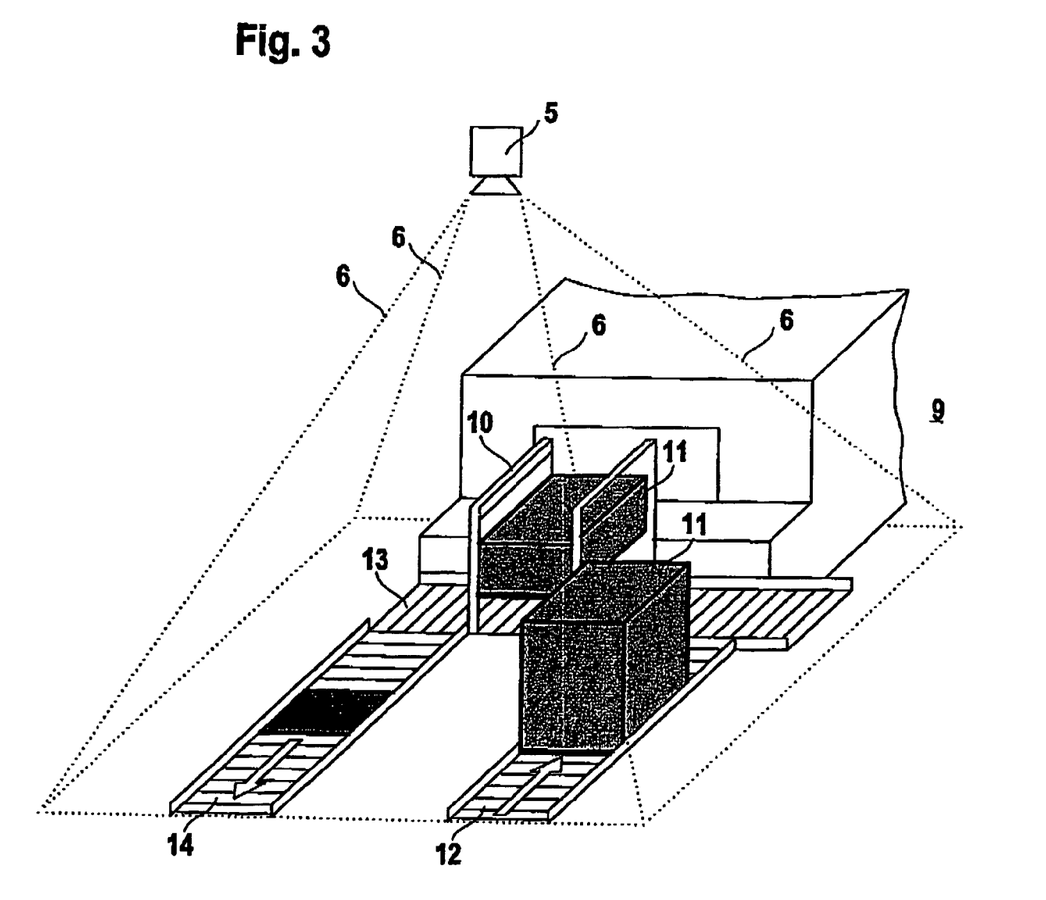
FIG. 3 is a working tool in the form of a printing machine, having a device according to the invention for monitoring an area of coverage that extends over the region of the feeder and the removal unit for the printing machine.
Figure 4:
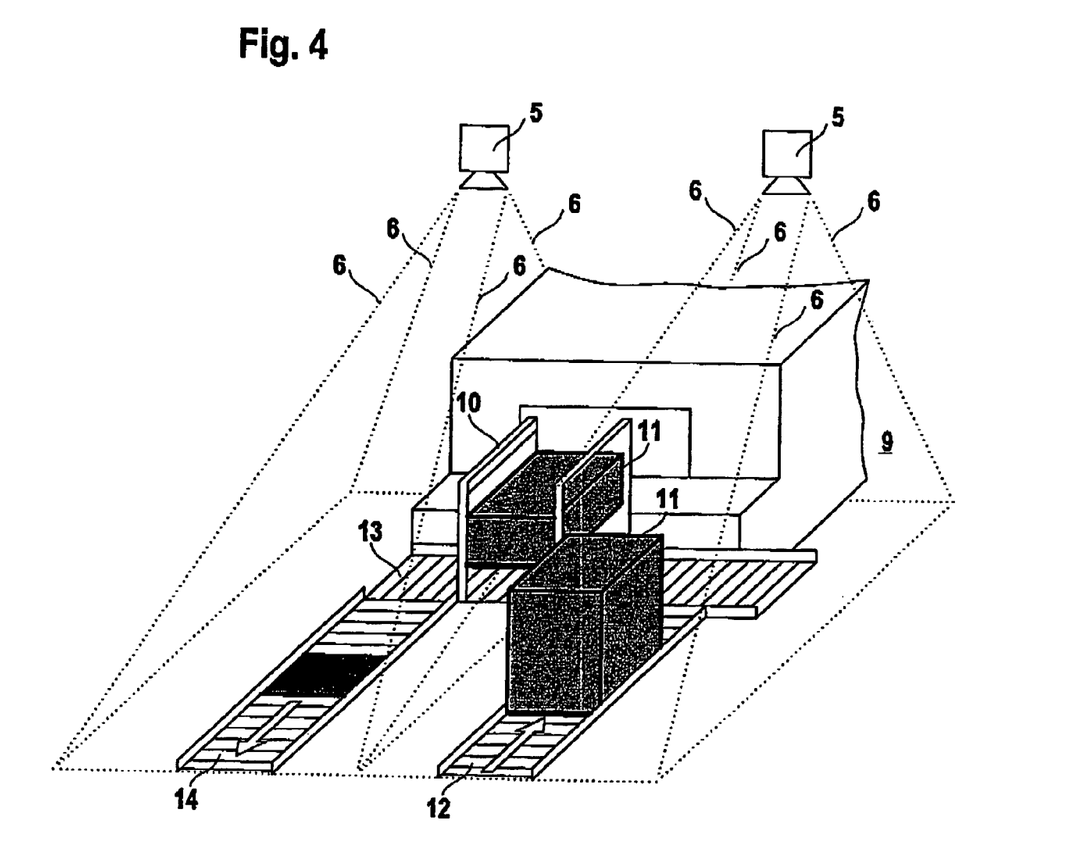
FIG. 4 is a printing machine according to FIG. 3 with two devices according to the invention for monitoring the region extending over the removal unit and the feeder.

FIGS. 3 and 4 show embodiments where the working tool that is monitored by the protective device according to the invention is a printing machine 9.

FIG. 3 shows a printing machine 9, comprising a feeder 10 and a removal unit. The feeder 10 forms the intake region where paper sheets are withdrawn from paper stacks 11 and are pulled into the printing unit of the printing machine 9. For this, the individual paper stacks 11 are supplied on pallets and via a first chain conveyor 12 to the feeder 10. In the feeder 10 region, the paper stacks 11 are transported on a roller conveyor 13. Once they are printed on, the paper sheets in the form of paper stacks 11, which are stacked on pallets, are transported in the removal region away from the printing machine 9 via a second chain conveyor 14. In the regions extending over the chain conveyors 12, 14 and the feeder 10, the danger of injury to the operating personnel exists as a result of the movements of the pallets holding the paper stacks 11.

With known printing machines 9, a fencing is used to secure these areas of coverage 6, which completely prevents any intervention by the operating personnel. As a result, the overview of and access to the printing machine 9 are restricted unnecessarily. In particular, it is not possible or only with great difficulty to position non-safety-critical objects in the area of coverage 6.

The device 5 according to FIG. 3 is installed together with the camera system above the printing machine 9, so that the area of coverage 6 monitored by this device includes the regions of the feeder 10 and the chain conveyors 12, 14.

The monitoring operation with the device 5 is realized in the same way as shown for the embodiment according to FIG. 1. In particular, the area of coverage 6 is again subdivided in a suitable manner into security zones 7 and, if necessary, into warning zones 8, within which safety-critical objects can be detected.

FIG. 4 shows a second exemplary embodiment of a protective device on a printing machine 9. The printing machine 9 in this case corresponds to the printing machine 9 shown in FIG. 3. In contrast to the protective device according to FIG. 3, two devices 5 for monitoring areas of coverage 6 are provided in the present case. The area of coverage 6 monitored by the first device 5 covers the first chain conveyor 12 for feeding paper stacks 11 to the printing machine 9.

The area of coverage 6 recorded by the second device 5 covers the second chain conveyor 14 for removing the paper stacks 11 from the printing machine 9.

The areas of coverage 6, monitored by the devices 5, in this case are dimensioned such that their widths exceed the widths of the chain conveyors 12, 14. In this way, safety-critical objects can be detected even before they have entered the region of chain conveyors 12, 14. For the orientation of the operating personnel, the borders of the security zones 7 within the areas of coverage 6 can be marked by lines on the floor of the hall in which the printing machine 9 is installed.

For the exemplary embodiments according to FIGS. 3 and 4 and prior to the start-up of the protective device, it is useful if the paper stacks 11 to be transported on the pallets are input and stored in the evaluation unit 53 as non safety-critical objects.

Figure 5:
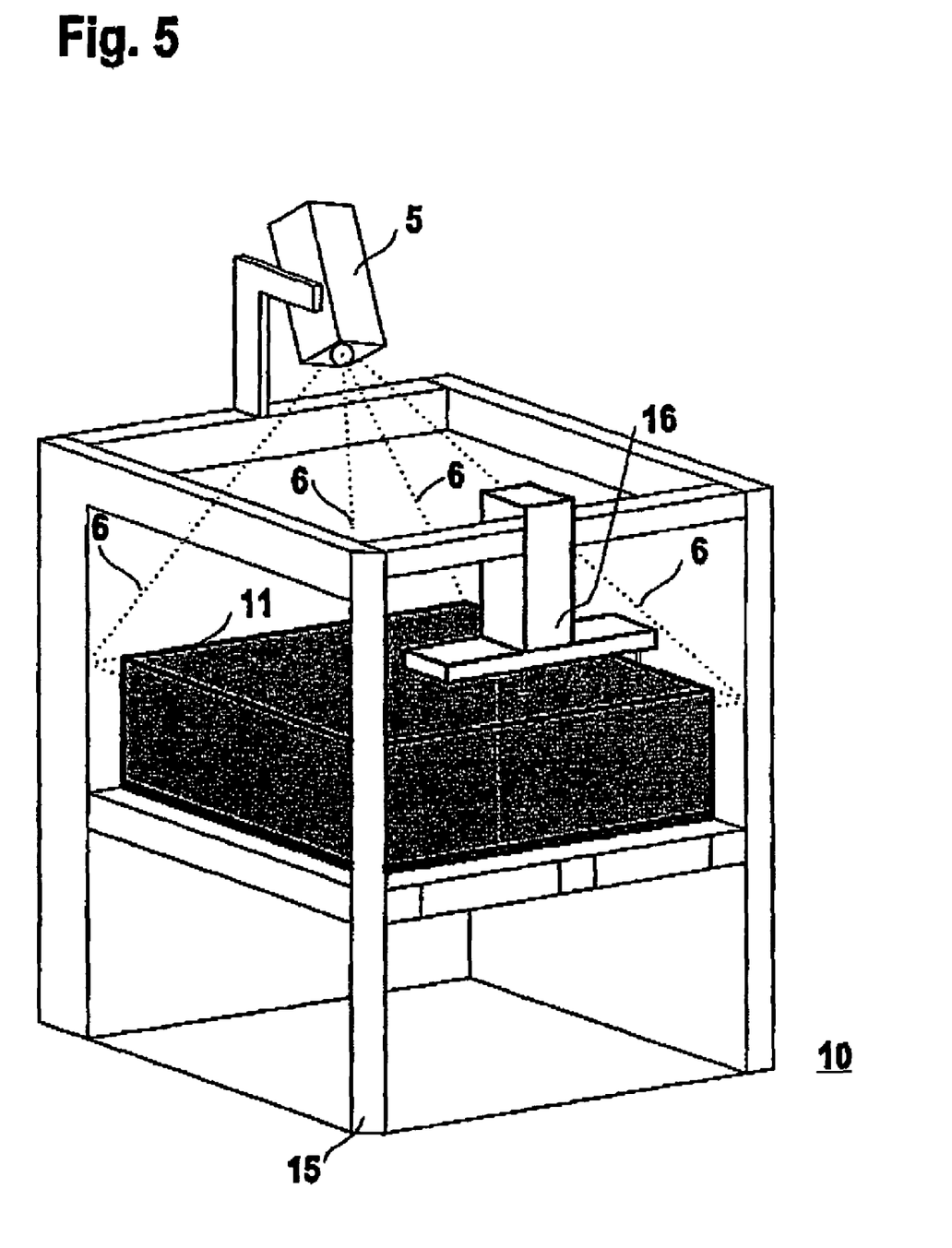
FIG. 5 illustrates a paper-intake region of the feeder for the printing machine, shown in FIG. 3 or 4, which is monitored by a device according to the invention.

FIG. 5 shows a feeder 10 for a printing machine 9, which is monitored by a single device 5. The design of this printing machine 9 corresponds to the design of the printing machine 9 shown in FIGS. 3 and 4.

The feeder 10 essentially consists of a frame 15 in which a paper stack 11 is arranged. By means of a gripper 16, paper sheets are pulled from the top of the paper stack 11 and are fed into the printing unit of the printing machine 9, which is not shown herein.

The device 5 is installed above the feeder 10, so that the area of coverage 6 that is covered by the camera system of the device 5 also covers the top of the paper stack 11 and the gripper 16. The security zone 7 within the area of coverage 6 is dimensioned such that the operating range of the gripper 16, which performs movements that are dangerous to the operating personnel, is covered completely.

Figure 6:
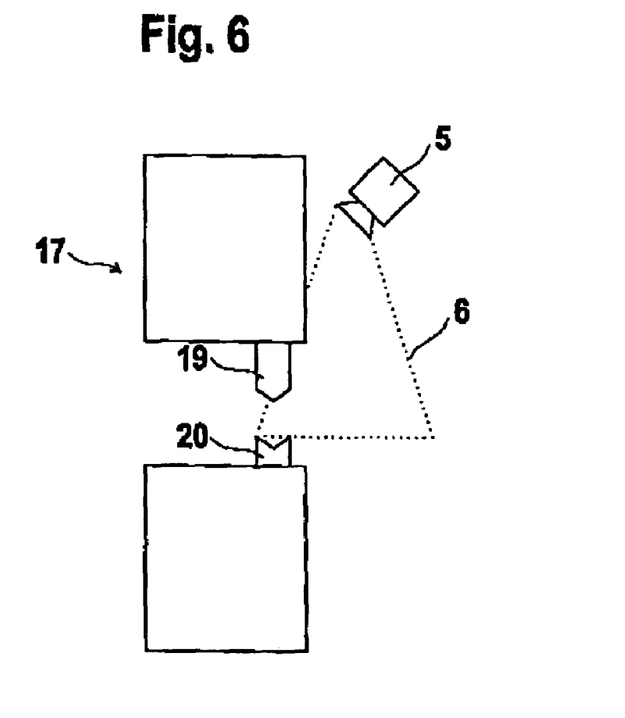
FIG. 6 is a side view of a working tool embodied as folding press, which has an upstream-installed device according to the invention for monitoring an area of coverage.
Figure 7:
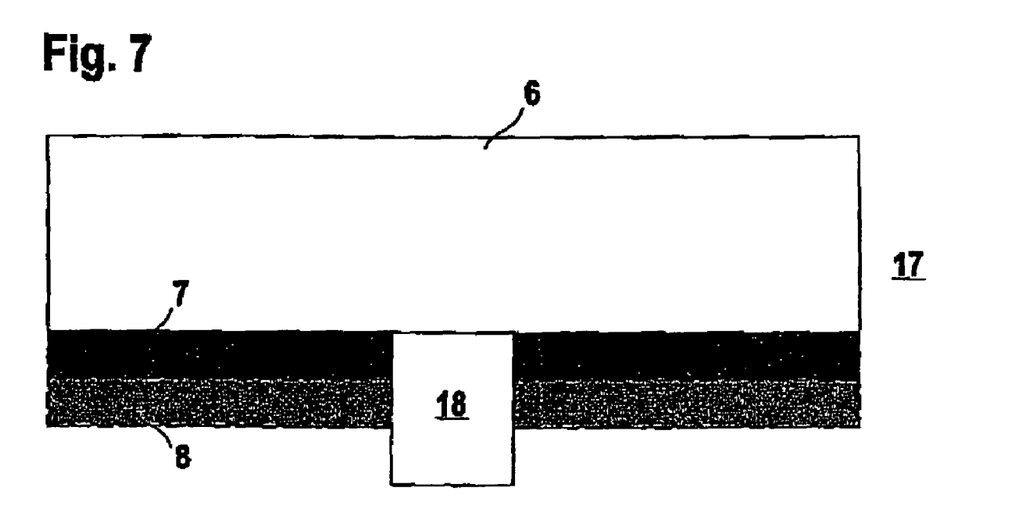
FIG. 7 is a cross-sectional view of a detail of the arrangement according to FIG. 1, with respectively one security zone and one warning zone located within an area of coverage.

FIGS. 6 and 7 show an exemplary embodiment of a working tool in the form of a folding press 17 which must be monitored to avoid danger to an operator. The folding press 17 is used to bend and shape work pieces 18, in particular sheet metal parts. A work piece 18 is respectively formed with the aid of a jointly operating upper tool 19 and a lower tool 20. During a pressing movement, the upper tool 19 and the lower tool 20 are moved toward each other, so that a work piece 18 positioned in-between is folded or bent along a bending line.

In order to process the work pieces 18, these are normally inserted by the operating personnel at predetermined positions between the upper tool 19 and the lower tool 20. As a result, the respective operator in particular is in danger of sustaining serious injuries when inserting his/her hands or fingers in the region between upper tool 19 and lower tool 20. Furthermore, the movement of the work piece 18 during the pressing operation also carries a considerable risk of injury to the operator. The device 5 according to the invention is again provided to protect the operator and covers as non-contacting protective device the area of coverage 6.

FIGS. 6 and 7 show that the area of coverage 6, monitored by the device 5, covers a three-dimensional space with a rectangular cross section for the basic surface. The longitudinal side of the area of coverage 6 in this case extends along the bending lines of the upper tool 19 and the lower tool 20, which are located within the area of coverage 6. The security zone 7 of this embodiment is configured as partial region of the area of coverage 6, for which the border along the longitudinal side extends parallel to the bending lines for the upper tool 19 and the lower tool 20. The warning zone 8 is located in the area surrounding the upper tool 19 and the lower tool 20 and directly adjoins the security zone 7.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A device for monitoring an area of coverage around a working tool comprising:
   at least two cameras, which form a redundant camera system, onto which a beam divider projects images of the area of coverage;
   at least two computer units that are coupled to the at least two cameras and at least one switching output that is coupled to the working tool, said switching output having means, integrated into the at least two computer units, for storing and classifying a reference background, wherein the reference background is an image, recorded with at least one of the at least two cameras, of an object-free security zone within the area of coverage, wherein one respective computer unit being associated with one of the at least two cameras for evaluating the image information recorded therein and wherein both computer units are coupled so as to perform mutual checks and the two computer units have different software structures;
   means for checking the reference background with respect to non-homogeneity, wherein the reference background is rejected as non-valid only if the non-homogeneity detected within a predetermined variance distance falls below a predetermined level and the reference background is otherwise classified as valid;
   means, integrated into the at least two computer units, for releasing an object detection system in dependence on the classification of the reference background; and
   means, integrated into one of the computer units, for comparing actual images of the security zone, recorded with one of the cameras and a reference background classified as valid, wherein a binary control signal having switching states is generated in the one of the computer units, the switching states of which indicate whether the existing reference background is classified as valid or non-valid, the switching states of the binary control signal being output via an indicator output that is coupled to the one of the computer units, wherein a detection of a safety-critical object within the security zone occurs if the actual image differs significantly from the reference background and wherein the working tool is activated via the switching output that is triggered by the computer unit, but only if no safety-critical object is located within the security zone.

2. The device according to claim 1, wherein the object detection system is released or blocked in dependence on the switching states of the binary control signal.

3. The device according to claim 1, wherein the switching output is actuated by both computer units.

4. The device according to claim 1, wherein the indicator output is activated by both computer units.

5. The device according to claim 1, wherein the two cameras of the camera system are identical or at least operate in the same way.

6. The device according to claim 1, wherein the reference background is stored in each computer unit and is checked with respect to its non-homogeneity.

7. The device according to claim 6, wherein the object detection system is released via the binary control signal, but only if the reference background in both computer units is classified as valid.

8. The device according to claim 1, wherein within the area of coverage that is covered by the camera system, at least one warning zone is defined in addition to the security zone, wherein a warning indicator is activated via a warning output if a safety-critical object is located in the warning zone.

9. The device according to claim 8, wherein the warning zone is adjacent to the security zone.

10. The device according to claim 9, wherein the movement direction of a safety-critical object within the warning zone can be detected.

11. The device according to claim 10, wherein the warning indicator is activated only if a safety-critical object is located within the warning zone and moves toward the security zone.

12. The device according to claim 8, wherein the reference background comprises the security zone and the warning zone.

13. The device according to claim 8, wherein several security zones and warning zones are respectively provided, wherein one switching output is assigned respectively to a respective security zone and a warning output is assigned to each respective warning zone.

14. The device according to claim 13, wherein the working tool is shut down if a safety-critical object is located in at least one security zone.

15. The device according to claim 1, wherein the working tool is one of a working robot and an assembly robot.

16. The device according to claim 1, wherein the working tool is a printing machine.

17. The device according to claim 1, wherein the working tool is a feeding device.

18. The device according to claim 1, wherein the working tool is a press.

19. The device according to claim 1, wherein the working tool is a folding press.

20. The device according to claim 1, wherein the safety-critical objects are persons.

21. The device according to claim 1, wherein the safety-critical objects are arms of a person.

22. A device for monitoring an area of coverage around a working tool comprising:

at least two cameras, which form a redundant camera system, onto which a beam divider projects images of the area of coverage;

at least two computer units that are coupled to the at least two cameras and at least one switching output that is coupled to the working tool, said switching output having means, integrated into the at least two computer units, for storing and classifying a reference background, wherein the reference background is an image, recorded with at least one of the at least two cameras, of an object-free security zone within the area of coverage, wherein one respective computer unit being associated with one of the at least two cameras for evaluating the image information recorded therein and wherein both computer units are coupled so as to perform mutual checks;

means for checking the reference background with respect to non-homogeneity, wherein the reference background is rejected as non-valid only if the non-homogeneity detected within a predetermined variance distance falls below a predetermined level and the reference background is otherwise classified as valid;

means, integrated into the at least two computer units, for releasing an object detection system in dependence on the classification of the reference background wherein for the object detection system a comparison is made between the images actually recorded with the two cameras and the reference background is stored in the two computer units, wherein image characteristics are obtained for the object detection system in the two computer units from the image information that is input with the aid of the two associated cameras, and wherein the image characteristics determined in the two computer units are compared via the connection between the two computer units; and means, integrated into one of the computer units, for comparing actual images of the security zone, recorded with one of the cameras and a reference background classified as valid, wherein a binary control signal having switching states is generated in the one of the computer units, the switching states of which indicate whether the existing reference background is classified as valid or non-valid, the switching states of the binary control signal being output via an indicator output that is coupled to the one of the computer units, wherein a detection of a safety-critical object within the security zone occurs if the actual image differs significantly from the reference background and wherein the working tool is activated via the switching output that is triggered by the computer unit, but only if no safety-critical object is located within the security zone and wherein the working tool is shut down via the switching output if the image characteristics detected in the individual computer units do not coincide.

23. The device according to claim 22, wherein the two computer units have identical hardware structures.

24. A device for monitoring an area of coverage around a working tool comprising:

at least two cameras, which form a redundant camera system, onto which a beam divider projects images of the area of coverage;

at least two computer units that are coupled to the at least two cameras and at least one switching output that is coupled to the working tool, said switching output having means, integrated into the at least two computer units, for storing and classifying a reference background, wherein the reference background is an image, recorded with at least one of the at least two cameras, of an object-free security zone within the area of coverage, wherein one respective computer unit being associated with one of the at least two cameras for evaluating the image information recorded therein and wherein both computer units are coupled so as to perform mutual checks;

means for checking the reference background with respect to non-homogeneity, wherein the reference background is rejected as non-valid only if the non-homogeneity detected within a predetermined variance distance falls below a predetermined level and the reference background is otherwise classified as valid;

means, integrated into the at least two computer units, for releasing an object detection system in dependence on the classification of the reference background wherein for the object detection system a comparison is made between the images actually recorded with the two cameras and the reference background is stored in the two computer units, wherein image characteristics are obtained for the object detection system in the two computer units from the image information that is input with the aid of the two associated cameras, and wherein the image characteristics determined in the two computer units are compared via the connection between the two computer units; and means, integrated into one of the computer units, for comparing actual images of the security zone, recorded with one of the cameras and a reference background classified as valid, wherein a binary control signal having switching states is generated in the one of the computer units, the switching states of which indicate whether the existing reference background is classified as valid or non-valid, the switching states of the binary control signal being output via an indicator output that is coupled to the one of the computer units, wherein a detection of a safety-critical object within the security zone occurs if the actual image differs significantly from the reference background and wherein the working tool is activated via the switching output that is triggered by the computer unit, but only if no safety-critical object is located within the security zone and wherein a working tool is shut down via the switching output if image characteristics assigned to a safety-critical object located in the security zone are detected jointly in both computer units.

* * * * *

UNITED STATES PATENT AND TRADEMARK OFFICE
CERTIFICATE OF CORRECTION

| | | |
|---|---|---|
| PATENT NO. | : 7,567,272 B2 | Page 1 of 1 |
| APPLICATION NO. | : 10/702093 | |
| DATED | : July 28, 2009 | |
| INVENTOR(S) | : Lohmann | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 945 days.

Delete the phrase "by 945 days" and insert -- by 1614 days --

Signed and Sealed this

Fourth Day of May, 2010

David J. Kappos
*Director of the United States Patent and Trademark Office*